(12) United States Patent
Simmons

(10) Patent No.: US 6,655,482 B2
(45) Date of Patent: Dec. 2, 2003

(54) DRIVE ASSEMBLY FOR A TRACK-TYPE MACHINE

(75) Inventor: Gerald Paul Simmons, Morton, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/024,041

(22) Filed: Dec. 21, 2001

(65) Prior Publication Data

US 2003/0116366 A1 Jun. 26, 2003

(51) Int. Cl.[7] .............................................. B62D 55/00
(52) U.S. Cl. ..................... 180/9.1; 180/9.62; 180/9.46
(58) Field of Search ......................... 180/9.1, 9.5, 9.44, 180/9.62, 9.64, 9.46

(56) References Cited

U.S. PATENT DOCUMENTS

| | | | |
|---|---|---|---|
| 3,656,642 A | 4/1972 | Kostas et al. ................ 214/140 |
| 3,776,326 A | * 12/1973 | Davin et al. ................. 180/9.1 |
| 3,828,873 A | 8/1974 | Oestmann .................... 180/9.5 |
| 4,739,852 A | 4/1988 | Stevens et al. ............. 180/70.1 |
| 4,874,052 A | * 10/1989 | Purcell et al. ............ 180/24.02 |
| 4,893,687 A | * 1/1990 | Simmons .................... 180/291 |
| 4,981,188 A | * 1/1991 | Kadela ....................... 180/9.25 |
| 5,058,382 A | 10/1991 | Inoue et al. .................. 60/488 |
| 5,193,632 A | * 3/1993 | Clar et al. .................. 180/65.5 |
| 5,358,064 A | * 10/1994 | Oertley ........................ 180/9.1 |
| 5,373,909 A | * 12/1994 | Dow et al. .................. 180/235 |
| 5,494,125 A | * 2/1996 | Gustin et al. ................ 180/9.1 |
| 5,679,090 A | 10/1997 | Imanishi ...................... 476/42 |
| 5,799,743 A | * 9/1998 | Robinson .................... 180/9.1 |
| 5,927,413 A | * 7/1999 | Miyaki et al. ............. 180/9.62 |
| 5,984,032 A | * 11/1999 | Gremillion et al. ......... 370/316 |
| 6,047,785 A | * 4/2000 | Snyder et al. ................ 180/9.1 |
| 6,066,061 A | 5/2000 | Yun ........................... 475/198 |
| 6,152,253 A | 11/2000 | Monaghan ................... 180/291 |
| 6,247,547 B1 | 6/2001 | Lemke et al. ................ 180/9.5 |

\* cited by examiner

*Primary Examiner*—Lesley D. Morris
*Assistant Examiner*—L. Lum
(74) *Attorney, Agent, or Firm*—Finnegan, Henderson, Farabow, Garrett & Dunner

(57) ABSTRACT

A drive assembly is provided that includes a roller frame, a motor located on the roller frame, and a drive system located on the roller frame. The drive assembly may also include an endless track configured to be driven by the drive system and adaptable to provide locomotion to the track-type machine. The motor may have a longitudinal axis substantially aligned with a longitudinal axis of the roller frame. The drive system may be driveably engaged with the motor. The endless track may be configured to be driven by the drive system and is adaptable to provide locomotion to a track-type machine. A track-type machine having the disclosed drive assembly and method of driving such a track-type machine is also provided.

23 Claims, 5 Drawing Sheets

DRIVE ASSEMBLY FOR A TRACK-TYPE MACHINE

TECHNICAL FIELD

The present invention is generally directed to track-type machines. More particularly, the present invention is directed to a drive assembly for a track-type machine.

BACKGROUND

Traditionally, track-type machines have been driven by a power source contained within the body of the track-type machine, as seen, for example, in U.S. Pat. No. 3,828,873. Usually, these power sources have been mechanically coupled to input shafts that extend through the machine frame and engage a pair of sprockets. These sprockets generally are supported on opposite sides of the machine frame and are rotatably mounted to the machine frame. The sprockets may directly or indirectly drive an endless track about a roller frame to provide movement of the machine. Each roller frame is generally supported behind its midpoint by a pivot shaft, which extends from the machine frame. Each roller frame is also generally supported in front of its midpoint by an equalizer bar attaching both roller frames together. The midpoint of the equalizer bar is attached at the lateral midpoint of the machine frame. The equalizer bar controls the rotation of each roller frame about its pivot shaft. As the front of one roller frame is forced to rise by externally applied forces or uneven ground, the opposite roller frame is forced to fall by the equalizer bar. Each roller frame has idler wheels affixed to each end to support the endless track as it rotates.

One limitation of having a sprocket that is mounted to the machine frame of the track-type machine is that the roller frame is constrained in its movement. For example, when the track type machine encounters an obstacle, on one side, the front of that side roller frame is urged upward and the front of the opposite side roller frame is urged downward by the equalizer bar. This motion is restricted by the proximity of the rising rear idler to the fixed position sprocket. This restriction limits the height of obstacles the machine can negotiate. This limitation also increases the harshness of the ride the machine operator feels as obstacles are encountered.

One alternative approach for providing power to drive a track-type machine is to have a motor cantilevered from the roller frame, as seen in U.S. Pat. No. 4,739,852. In this arrangement, the motor is arranged such that the axis of rotation of the power source is parallel to the axis of rotation of a drive system. However, one disadvantage of this arrangement is that the size of the power source is constrained. In addition, this type of machine does not have a roller frame that can pivot when it encounters an obstacle in the working environment.

The present invention solves one or more of the problems associated with existing track-type machine designs.

SUMMARY OF THE INVENTION

One aspect of the present invention is directed to a drive assembly including a roller frame, a motor located on the roller frame, and a drive system located on the roller frame. The drive system may be driveably engaged with the motor. The motor may have a longitudinal axis substantially aligned with a longitudinal axis of the roller frame.

Another aspect of the present invention is directed to a track-type machine including a machine frame and a roller frame supported on the machine frame in a manner to provide for pivotal movement of the roller frame relative to the machine frame. A motor may be located on the roller frame and may be driveably engaged with a drive system located on the roller frame. An endless track may be driven by the drive system to provide locomotion for the track-type machine.

In yet another aspect, the invention is directed to a track-type machine including a machine frame and a roller frame supported on the machine frame. The roller frame may include a housing. A motor may be located on the roller frame and may be driveably engaged with a drive system, which may be supported within the housing of the roller frame. An endless track may be driven by the drive system to provide locomotion for the track-type machine.

The present invention is also directed to a method of driving a track-type machine having a machine frame. The method includes providing at least one drive assembly including a roller frame supported on the machine frame in a manner to provide for pivotal movement relative to the machine frame, a motor located on the roller frame, a drive system located on the roller frame and driveably engaged with the motor, and an endless track driven by the drive system to provide locomotion for the machine. The method also includes providing power from the motor on the roller frame to the drive system. The drive system drives the endless track.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

DETAILED DESCRIPTION

Reference will now be made in detail to the present exemplary embodiment of the invention, which is illustrated in the accompanying drawings. Wherever possible, the same reference numbers will be used throughout the drawings to refer to the same or like parts.

Figure 1:
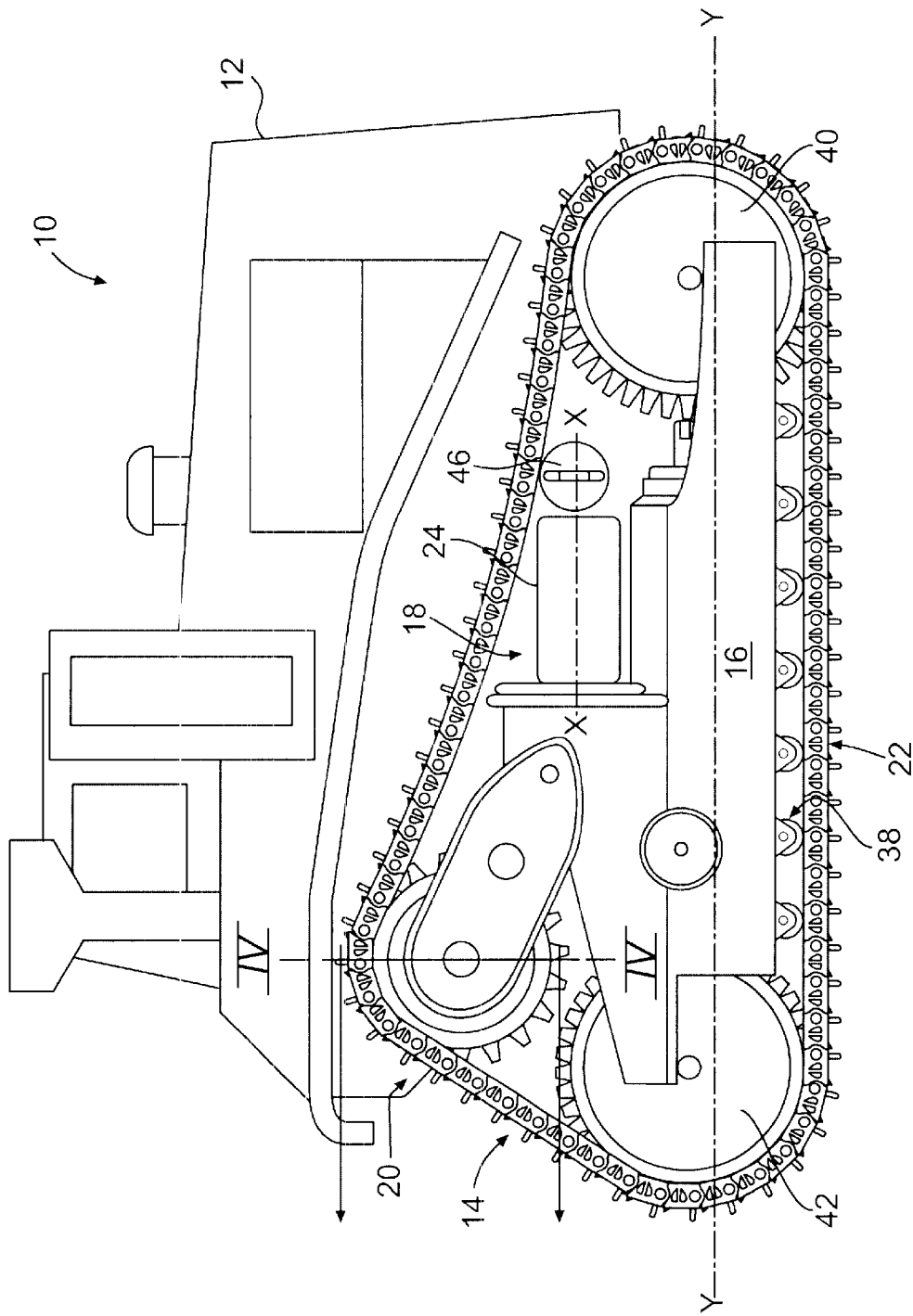
FIG. 1 is a diagrammatic elevation view of an exemplary embodiment of a track-type machine of the present invention.
Figure 5:
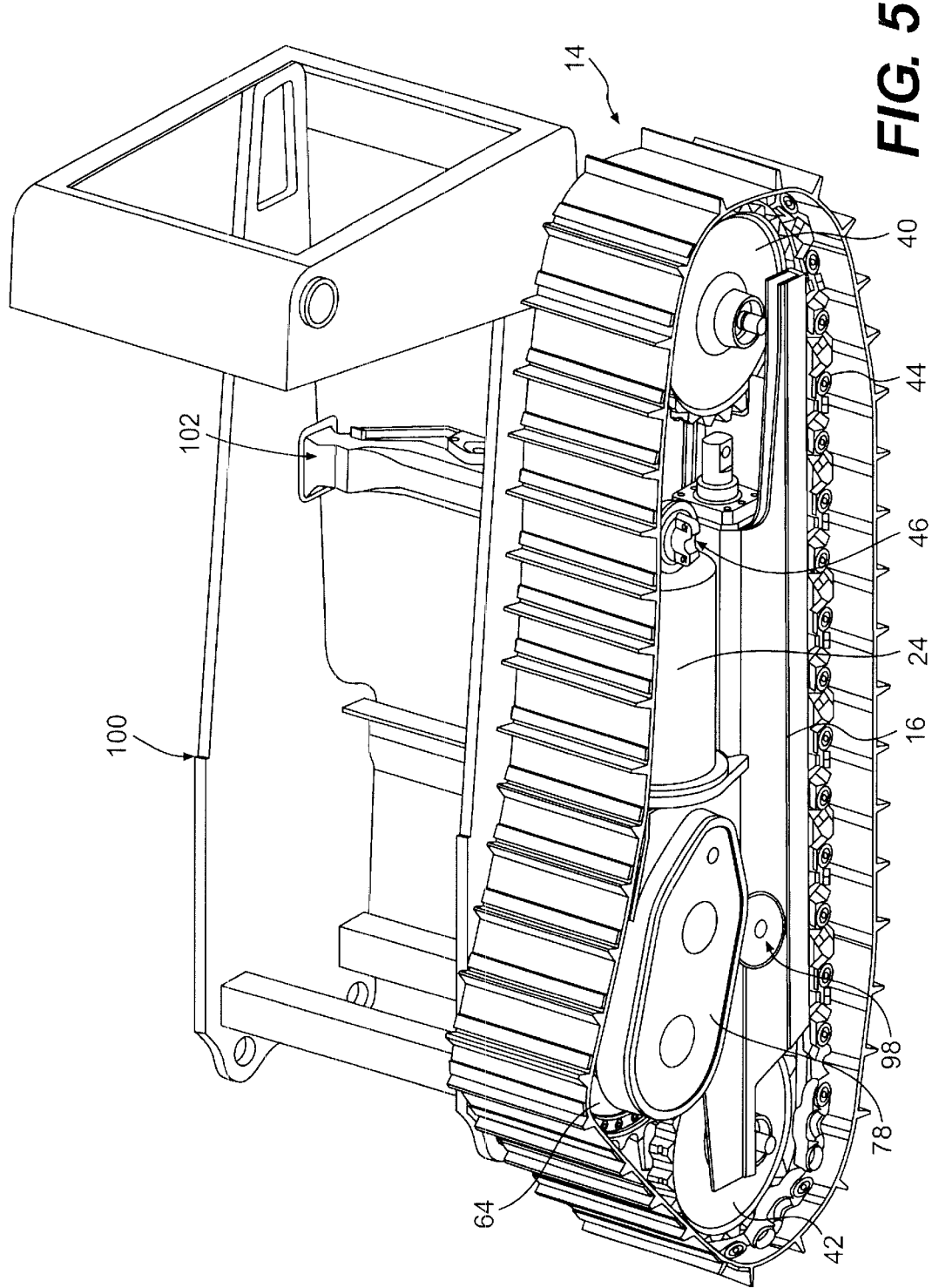
FIG. 5 is a diagrammatic perspective view of a drive assembly and machine frame of the exemplary embodiment of FIG. 1.

A track-type machine 10 may include a body 12 and a pair of drive assemblies supported on a machine frame 100 (shown in FIG. 5). While only a single drive assembly 14 is shown in the accompanying drawings, it is understood that complimentary drive assemblies are typically provided on opposing sides of a track-type machine. Moreover, while FIG. 1 shows a high-drive track-type machine 10, embodiments of the present invention are equally applicable to other variations of track-type machines. A power source (not shown), such as an engine, may be supported in the body 12 and connected to the motor on the drive assembly using known techniques.

Figure 2:
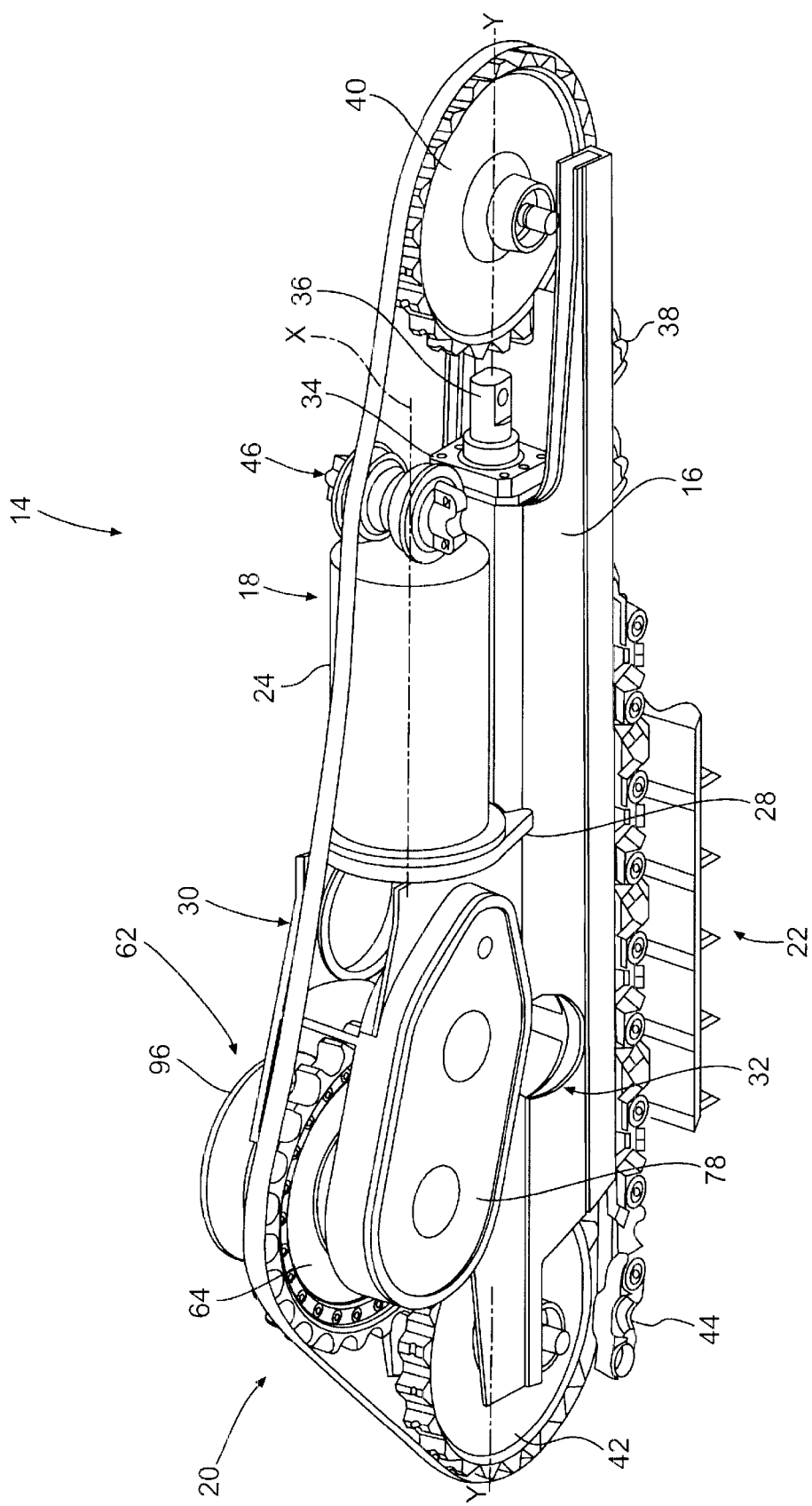
FIG. 2 is a diagrammatic perspective view of a single drive assembly of the exemplary track-type machine of FIG. 1, with a portion of the endless track removed for clarity.

With reference to FIG. 2, each drive assembly 14 includes a roller frame 16, which may be formed out of steel or any other suitable material, and a motor 18 located on the roller frame 16. A drive system 20 is also located on the roller frame 16 and is driveably engaged with the motor 18. An endless track 22 is driven about the roller frame 16 by the drive system 20 to provide locomotion for the track-type machine 10. Because the motor 18 and the drive system 20 are located on the roller frame 16, it is possible to support the roller frame 16 to allow pivotal movement relative to the machine frame 100, as will be described further with reference to FIG. 5. In addition, the drive system 20 may be elevated to assist the endless track 22 in clearing the motor 18.

Figure 4:
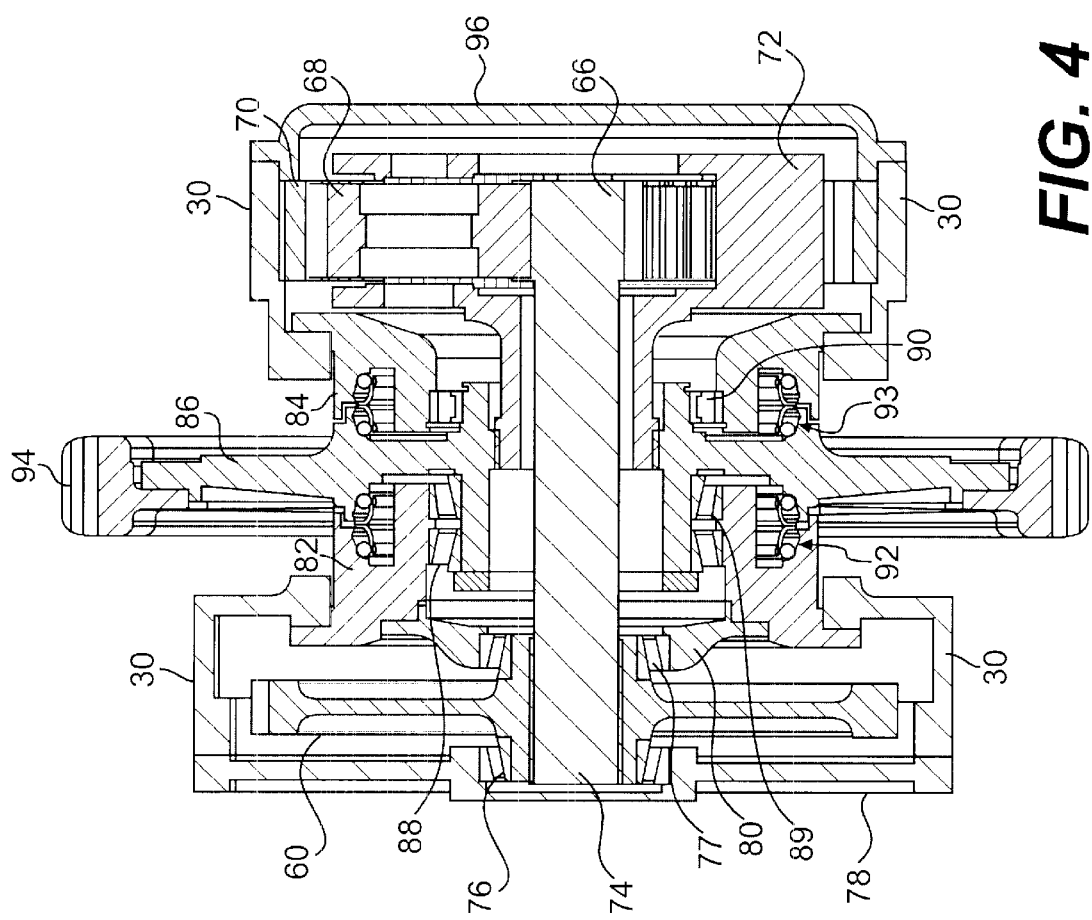
FIG. 4 is a cross-sectional view of the housing and planetary system taken along line IV—IV of FIG. 1.

Motor 18 may be an electrical motor 24 having an output shaft 26 (shown in FIG. 4). Electrical motor 24 may be mounted to the roller frame 16 and supported in a support flange 28. One of ordinary skill in the art will appreciate that other means of supporting the electrical motor 24 may be provided on the roller frame 16. The output shaft 26 defines a longitudinal axis X of the electrical motor 24 that may be substantially aligned with a longitudinal axis Y of the roller frame 16. In the exemplary embodiment shown, the longitudinal axis X is substantially parallel to the longitudinal axis Y, although it is understood that the longitudinal axis X may have a vertical component with respect to the longitudinal axis Y, for example, the longitudinal axis X may make a vertical 45° angle with respect to the longitudinal axis Y.

In this exemplary embodiment, the motor 18 is an electrical motor, however, one of ordinary skill in the art will appreciate that a hydrostatic motor or other motor may work as well. The electrical or hydrostatic motor can provide continuous variable rotation speeds, which may be useful when it is necessary to drive one side of a track-type machine 10 more slowly than the other side, for example, to turn the track-type machine 10.

The roller frame 16 includes a housing 30, such as, for example, a gear box, to support the drive system 20 on the roller frame. The housing 30 may be arranged so at least part of the housing is higher than the motor so the endless track can clear the motor 18 without interference.

A support hole 32 may be provided in the roller frame 16 to receive a pivot shaft 98 (shown in FIG. 5) from the track-type machine 10. A bearing support (not shown) may also be provided in the support hole to allow the roller frame 16 to pivot about the pivot shaft 98. A recoil mechanism housing 34 may be formed in the roller frame 16 and is configured to protect a recoil mechanism 36. A plurality of rollers 38 mounted to the roller frame 16 are configured to allow rotation of the endless track 22 about the roller frame 16. These rollers 38 may be fastened directly to the roller frame 16 or otherwise connected thereto.

The recoil mechanism 36 may be connected to a forward idler 40 via a spring (not shown) to allow the forward idler 40 to move fore and aft with respect to the roller frame 16. This allows the endless track 22 to absorb an impact with an object by allowing an initial displacement of the forward idler 40 upon contact with the object. The recoil system also is able to absorb injection of foreign material into the endless track system without over-tensioning the track.

A rearward idler 42 is also supported by the roller frame 16 and the endless track is entrained around the rearward idler 42 and forward idler 40. The rearward idler 42 is configured to facilitate contact between the endless track 22 and the plurality of rollers 38 of the roller frame 16. Both of the idlers 40, 42 as shown in FIG. 2, include teeth configured to cooperate with a chain 44 of the track. It is contemplated, however, the idlers 40, 42 need not include teeth. Smooth idlers could also work in entraining the endless track 22 about the roller frame 16.

In addition to the idlers 40, 42, a support roller 46 may be included to ensure the endless track 22 clears the motor 18 and to pick up slack in the endless track 22. The support roller 46 may be mounted on the roller frame 16 by an intermediate member (not shown).

Figure 3:
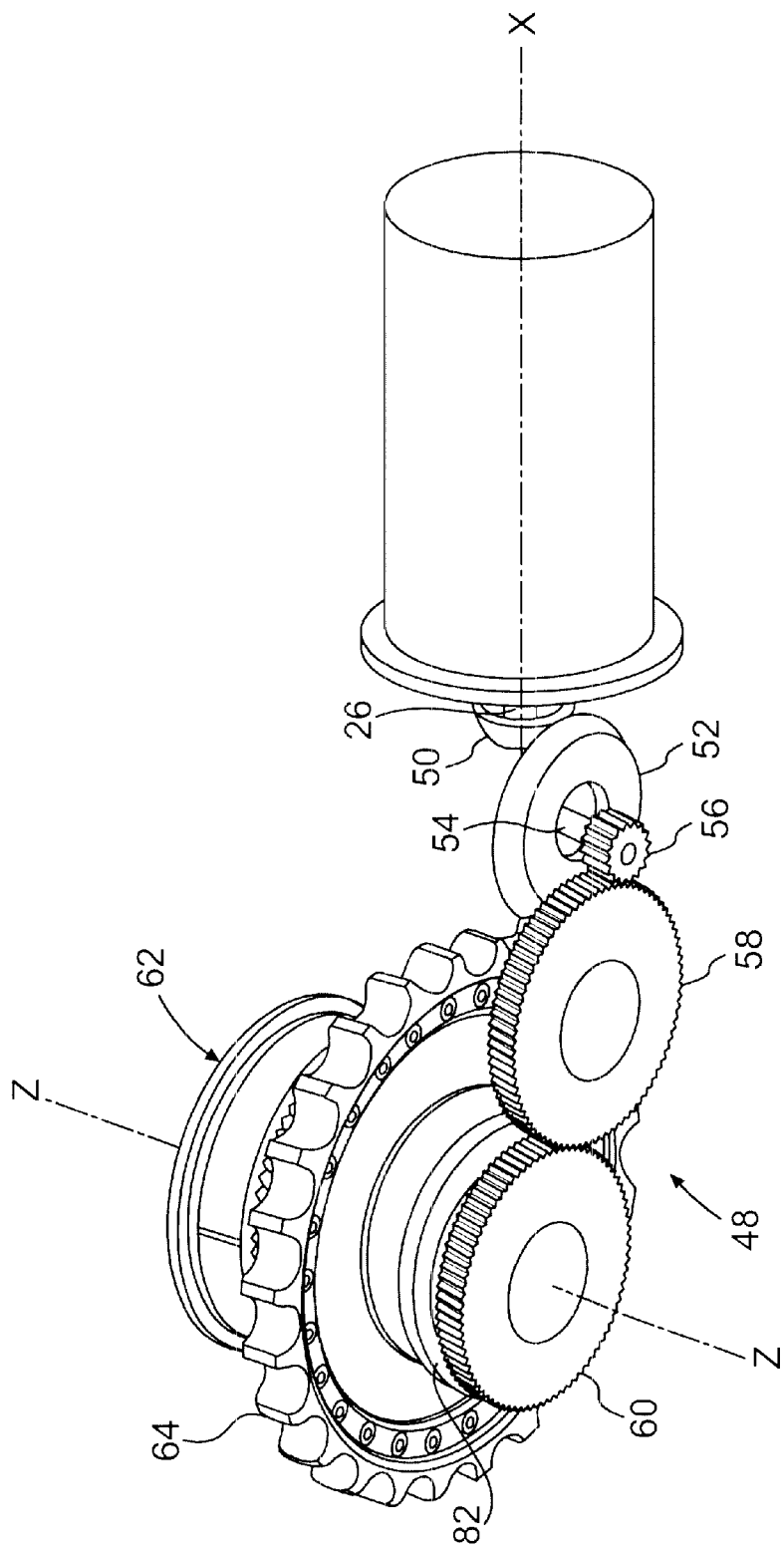
FIG. 3 is a diagrammatic perspective view of a drive system, motor, and gear train of the exemplary drive assembly of FIG. 2.

FIG. 3 shows an exemplary embodiment of a gear train 48 intermeshing the output shaft 26 to the drive system 20 to drive the endless track 22 about the roller frame 16. The gear train 48 may be connected to the output shaft 26 via a first beveled gear 50 supported on the output shaft 26 and intermeshing with a second beveled gear 52 (the teeth of the beveled gears are not shown for clarity). The second beveled gear 52 may be attached to one end of an input shaft 54 which may be supported by a portion of the housing 30 (not shown for clarity). A pinion 56 may be attached to the other end of the input shaft 54 and may intermesh with an idler gear 58, which may also be supported by the housing 30. The idler gear 58, in turn, may intermesh with a drive gear 60 that is connected to a planetary system 62. A sprocket 64 is connected to the planetary system 62 and is driven by rotation of the planetary system 62. It is understood that any suitable bearings may be used to support the pinion 56 and other gears in the housing 30.

The gear train 48 and planetary system 62 may provide desired speed reductions. In this exemplary embodiment, for example, the following reductions; of speed are provided: approximately 3:1 between the output shaft 26 and the second beveled gear 52; approximately 3:1 between pinion 56 and drive gear 60; and approximately 5:1 between the drive gear 60 and the sprocket 64. Although specific reductions have been described for the gear train 48, it is understood that different reductions could be provided based on the motor 18 and the desired rotation of the sprocket 64. In addition, it is understood that a different gear train may be provided to transmit power from the motor 18 to the sprocket 64. All such modifications are known to those of ordinary skill in the art and considered to be within the scope of the described invention. In addition a brake system (not shown) may be provided to prevent rotation of the shaft 56 when it is desired to stop the track-type machine 10.

FIG. 4 shows a cross-sectional view of the planetary system 62. The planetary system 62 may include a sun gear 66, a plurality of planetary gears 68 (only one of which is shown in the cross-section view), a ring gear 70, and a carrier 72.

The drive gear 60 may be splined to a shaft portion 74 of the sun gear 66. It is to be understood that the sun gear 66 and shaft portion 74 may be formed as a single piece, as shown, or as separate pieces that are fitted together. As best seen in FIG. 3, the shaft portion 74 defines a rotational axis Z for the sun gear 66, which may be oriented substantially perpendicular to the longitudinal axis X of the electrical motor 24. It is understood that the rotational axis Z does not have to intersect the longitudinal axis X of the electrical motor.

The drive gear 60 and shaft portion 74 may be supported within the housing 30 by a plurality of tapered roller bearing assemblies 76, 77. One tapered roller bearing assembly 76 may be supported within the cover 78 of the housing 30. The other tapered roller bearing assembly 77 may be supported in a bearing carrier 80, which may be supported by one of a pair of support hubs 82, 84.

The support hubs 82, 84 may be connected to the housing 30 using any suitable means, such as, for example, bolting (not shown). The support hubs 82, 84 may also be configured to support a sprocket hub 86 and to allow rotation thereof. This may be accomplished by providing a pair of tapered roller bearings assemblies, 88, 89 between the sprocket hub 86 and the support hub 82 and by providing a roller bearing assembly 90 between the sprocket hub 86 and the support hub 84. In addition, a plurality of sealing devices 92, 93, such as, for example, dual cone seals, may also be provided between the sprocket hub 86 and the support hub 82 to seal the sprocket hub 86 and the support hubs 82, 84.

The sprocket 64 may be formed by attaching a plurality of sprocket segments 94 to the sprocket hub 86. The sprocket segments 94 may be bolted to or attached by any other suitable means to the sprocket hub 86. Alternatively, sprocket segments 94 and sprocket hub 86 may be formed as an integral unit. The sprocket hub 86 may be attached to the carrier 72 and should be capable of rotating with and driven by the carrier 72.

The carrier 72 may be attached to the plurality of planetary gears 68, which intermesh with both the sun gear 66 and the ring gear 70. In the exemplary embodiment shown, the ring gear is affixed to the housing 30 and does not rotate. Because the ring gear 70 is held stationary, the carrier is driven by rotation of the planetary gears 68 about the sun gear 66, which in turn, drives the sprocket 64.

A cover 96 is also attached to the housing opposite the cover 78 to protect the planetary system 62 in the housing 30. The covers 78, 96 may be made of the same material as the roller frame 16, or any other suitable material.

For the exemplary embodiment described above, a rotation of 3000 rpm of the output shaft 26 may be converted into a rotation of approximately 67 rpm at the sprocket 64. As the output shaft 26 rotates at 3000 rpm, the first beveled gear 50 will also be rotating at 3000 rpm. Through the intermeshing of the first beveled gear 50 and the second beveled gear 52, the input shaft 54 will rotate at about 1000 rpm as a result of the 3:1 reduction. As the pinion 56 rotates at 1000 rpm, the drive gear 60 will rotate at approximately 333 rpm because of the 3:1 reduction between the pinion 56 and the drive gear 60. The sun gear 66 will rotate at the same speed as the drive gear 60, which will cause the sprocket 64 to rotate at approximately 67 rpm because of the 5:1 reduction of the planetary system 62. Therefore, the entire reduction from the output shaft 26 to the sprocket 64 is approximately 45:1. It is possible to control the rotation of the sprocket 64 to any desired speed by providing the appropriate output shaft rotation and modifying the speed reduction within the drive system.

As seen in FIG. 5, at least one drive assembly 14 may be supported on the machine frame 100 by a pivot shaft 98 extending from the machine frame 100. It is contemplated that the pivot shaft 98 may be formed separate from the machine frame 100, and later connected thereto. It is also possible to have the pivot shaft 98 formed integrally with the machine frame 100. The roller frame 16 may be retrained on the pivot shaft by any suitable means, such as, for example, providing sleeve bearings between the roller frame and the pivot shaft. A thrust plate may also be supplied to retain the sleeve bearing on the pivot shaft and prevent the roller frame from sliding off of the pivot shaft and, in addition to resist lateral external loads on the roller frame.

A second drive assembly (not shown for clarity), similar to the drive assembly 14 described above, can be provided on the opposite side of the body 12 to provide locomotion of the track-type machine 10. A pivot shaft may also be attached on opposite sides of a machine frame 100. Alternatively, a single pivot shaft may extend through the machine frame 100 and a drive assembly 14 may be supported on each end of the pivot shaft.

An equalizer bar 102 may also be provided to connect the two opposing drive assemblies 14 together. The equalizer bar 102 extends between the two opposing drive assemblies and may be supported by a pin connected to a center point beneath the machine frame 100 (not shown). Each end of the equalizer bar may be attached to the opposing drive assemblies 14 using known techniques, such as, for example, providing spherical joints. When one drive assembly 14 pivots in one direction, the equalizer bar 102 can force the other drive assembly 14 to pivot in the opposite direction to maintain sufficient contact with the ground or other surface.

By supporting the drive assembly 14 on the pivot shaft 98, the drive assembly is free to pivot relative to the machine frame 100. This is accomplished because the motor 18, gear train 48, and drive system 20 are all supported on the roller frame 16. Therefore, the entire roller frame 16 is free to pivot about the pivot shaft 98. In this arrangement, an obstacle encountered by the drive assembly 14 can be driven over by the drive assembly 14. The equalizer bar 102 can assist the track-type machine 10 in clearing the obstacle. As one drive assembly 14 drives over the obstacle, the other drive assembly is forced downwards. This, in turn, lifts the machine frame 100 through the equalizer bar 102 so that the track-type machine 10 can clear the obstacle. In addition, because the drive system 20 is supported on the roller frame 16 free of the machine frame 100, the roller frame 16 is connected to the machine frame 100 only via the hollow pivot shaft 24 and the equalizer bar 102. With this arrangement, the drive assembly 14 is not rotationally fixed, but rather, is free to pivot relative to the machine frame 100. This arrangement allows for greater flexibility in pivoting of the drive assembly when encountering obstacles and an improved machine operator ride.

Industrial Applicability

The drive assembly 14 of the present invention may be used on various track-type machines 10. For example, the drive assembly may be used with a tractor, track skidder, and other construction machines where an endless track is desirable. The drive assembly 14 may also be used to provide locomotion to, for example, heavy farm machines and forestry vehicles.

The endless track 22 of the track-type machine 10 may be driven by providing power from the motor 18 to the drive system 20. The transmission of such power may be accomplished by transmitting the power from the motor 18 to the drive system 20 via the gear train 48. For example, when the motor is an electrical motor 24 with an output shaft 26, the transmission of power includes converting the rotation of the output shaft 24 to translational motion of the endless track 22 about the roller frame. In this arrangement, the rotation of the first beveled gear 50 would drive the rotation of the pinion 56 via the first beveled gear intermeshing with the second beveled gear 54. The rotation of the pinion 56 would cause rotation of the drive gear 60 via the rotation of the idler gear 58. The rotation of the drive gear 60 would drive the sprocket through its connection to the planetary system. The rotation of the sprocket 64 would translate into translational motion of the track, which can be used to provide locomotion to the track-type machine. In this manner, the power from the motor is transmitted along the longitudinal axis Y of the roller frame 16.

Steering of the track-type machine 10 may be accomplished by providing two drive assemblies 14 supported on the machine frame 100 and operating the respective motor 18 of each drive assembly at different speeds. This action, in turn, will lead to the respective endless tracks 22 moving at different speeds. By moving one endless track faster than the other endless track, the vehicle will turn towards the direction of the slower moving track.

Because the drive assembly is configured to allow for pivotal movement relative to the machine frame and the opposing drive assembly, the track-type vehicle has greater flexibility in moving over uneven terrain. Moreover, because the motor 18 is supported on the roller frame 16, the size of the motor is not as limited as in the case where the motor is cantilevered off the side of the roller frame.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A drive assembly, comprising:
   a roller frame;
   a motor located on the roller frame, the motor having a longitudinal axis substantially aligned with a longitudinal axis of the roller frame; and
   a drive system located on the roller frame and being driveably engaged with the motor, wherein the motor includes an output shaft defining the longitudinal axis of the motor.

2. The drive assembly according to claim 1, further including an endless track configured to be driven by the drive system and adaptable to provide locomotion to a track-type machine.

3. The drive assembly according to claim 1, wherein the motor is an electrical motor.

4. The drive assembly according to claim 1, wherein the motor is a hydrostatic motor.

5. The drive assembly according to claim 1, further including a gear train intermeshing the drive system to the output shaft of the motor.

6. The drive assembly according to claim 1, further including an endless track configured to be driven by the drive system and adaptable to provide locomotion to a track-type machine, and wherein the drive system includes a planetary system supported by the roller frame and a sprocket operatively connected to the planetary system, the sprocket being configured to drive the track.

7. The drive assembly according to claim 6, wherein the planetary system includes a sun gear having an axis of rotation that is oriented substantially perpendicular to the longitudinal axis of the output shaft of the motor.

8. A drive assembly, comprising:
   a roller frame;
   a motor located on the roller frame, the motor having a longitudinal axis substantially aligned with a longitudinal axis of the roller frame; and
   a drive system located on the roller frame and being driveably engaged with the motor, wherein the drive system is elevated above the motor.

9. A track-type machine, comprising:
   a machine frame;
   a roller frame supported on the machine frame in a manner to provide for pivotal movement of the roller frame relative to the machine frame;
   a motor located on the roller frame;
   a drive system located on the roller frame and driveably engaged with the motor; and
   an endless track driven by the drive system to provide locomotion for the track-type machine.

10. The track-type machine according to claim 9, wherein the motor includes an output shaft, the output shaft defining a longitudinal axis of the motor that is substantially aligned with a longitudinal axis of the roller frame.

11. The track-type machine according to claim 10, wherein the motor is an electrical motor.

12. The track-type machine according to claim 10, wherein the motor is a hydrostatic motor.

13. The track-type machine according to claim 10, further including a gear train supported on the roller frame and intermeshing the drive system with the output shaft of the motor.

14. The track-type machine according to claim 10, wherein the drive system is elevated above the motor.

15. A track-type machine, comprising:
    a machine frame;
    a roller frame supported on the machine frame, the roller frame including a housing;
    a motor located on the roller frame;
    a drive system driveably engaged with the motor, the drive system being supported within the housing of the roller frame; and
    an endless track driven by the drive system to provide locomotion for the track-type machine, wherein the drive system includes a planetary system and a sprocket operatively connected to the planetary system, the sprocket being configured to drive the track, and wherein the motor includes an output shaft defining a longitudinal axis of the motor, and the planetary system includes a sun gear having an axis of rotation oriented substantially perpendicular to the longitudinal axis of the motor.

16. The track-type machine according to claim 15, further including a gear train supported on the roller frame and intermeshing the output shaft of the motor to the sun gear of the planetary system.

17. A track-type machine, comprising:
    a machine frame;
    a roller frame supported on the machine frame, the roller frame including a housing;
    a pivot shaft extending from the machine frame and wherein the roller frame is supported on the pivot shaft;
    a motor located on the roller frame;
    a drive system driveably engaged with the motor, the drive system being supported within the housing of the roller frame; and
    an endless track driven by the drive system to provide locomotion for the track-type machine.

18. The track-type machine according to claim 17, wherein at least part of the housing is higher than the motor so the endless track can clear the motor.

19. A method of driving a track-type machine having a machine frame, the method comprising:
    providing at least one drive assembly including a roller frame supported on the machine frame in a manner to provide for pivotal movement relative to the machine frame, a motor located on the roller frame, a drive system located on the roller frame and driveably engaged with the motor, and an endless track driven by the drive system to provide locomotion for the machine;

providing power from the motor on the roller frame to the drive system; and driving the endless track with the drive system.

20. The method according to claim 19, further including a gear train connecting the motor to the drive system, the method including transmitting power from the motor to the drive system via the gear train.

21. The method according to claim 19, wherein the motor includes an output shaft having a longitudinal axis substantially aligned with a longitudinal axis of the roller frame, the method including converting rotation of the output shaft to translational motion of the endless track via the drive system.

22. The method according to claim 19, wherein the method includes transmitting power along a longitudinal axis of the roller frame.

23. The method according to claim 19, wherein the step of providing at least one drive assembly includes providing a second drive assembly on the side of the machine frame opposite the at least one drive assembly, wherein the second drive assembly includes a second roller frame supported on the machine frame in a manner to provide for pivotal movement relative to the machine frame, a second motor located on the second roller frame, a second drive system located on the second roller frame and driveably engaged with the second motor, and a second endless track driven by the second drive system to provide locomotion for the machine, and the method further includes steering the track-type machine by controlling the motor of each drive assembly independent of the other motor.

* * * * *